Oct. 7, 1952          T. A. SMITH          2,612,998
APPARATUS FOR REMOVAL OF OIL TANK SLUDGE AND SEDIMENT
Filed March 12, 1947          2 SHEETS—SHEET 1
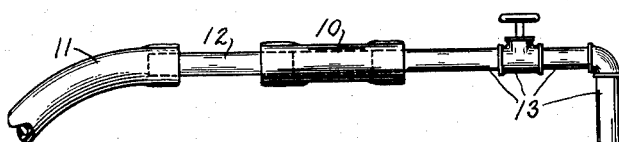
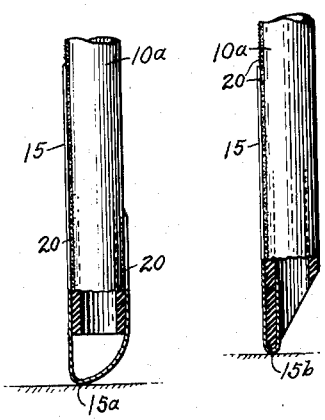
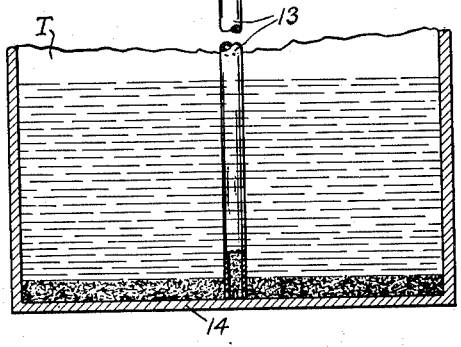
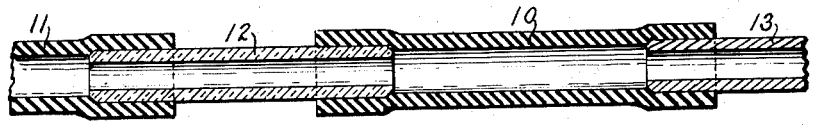
Inventor,
TALBOT A. SMITH.
By Sterling P. Buck,
Attorney.

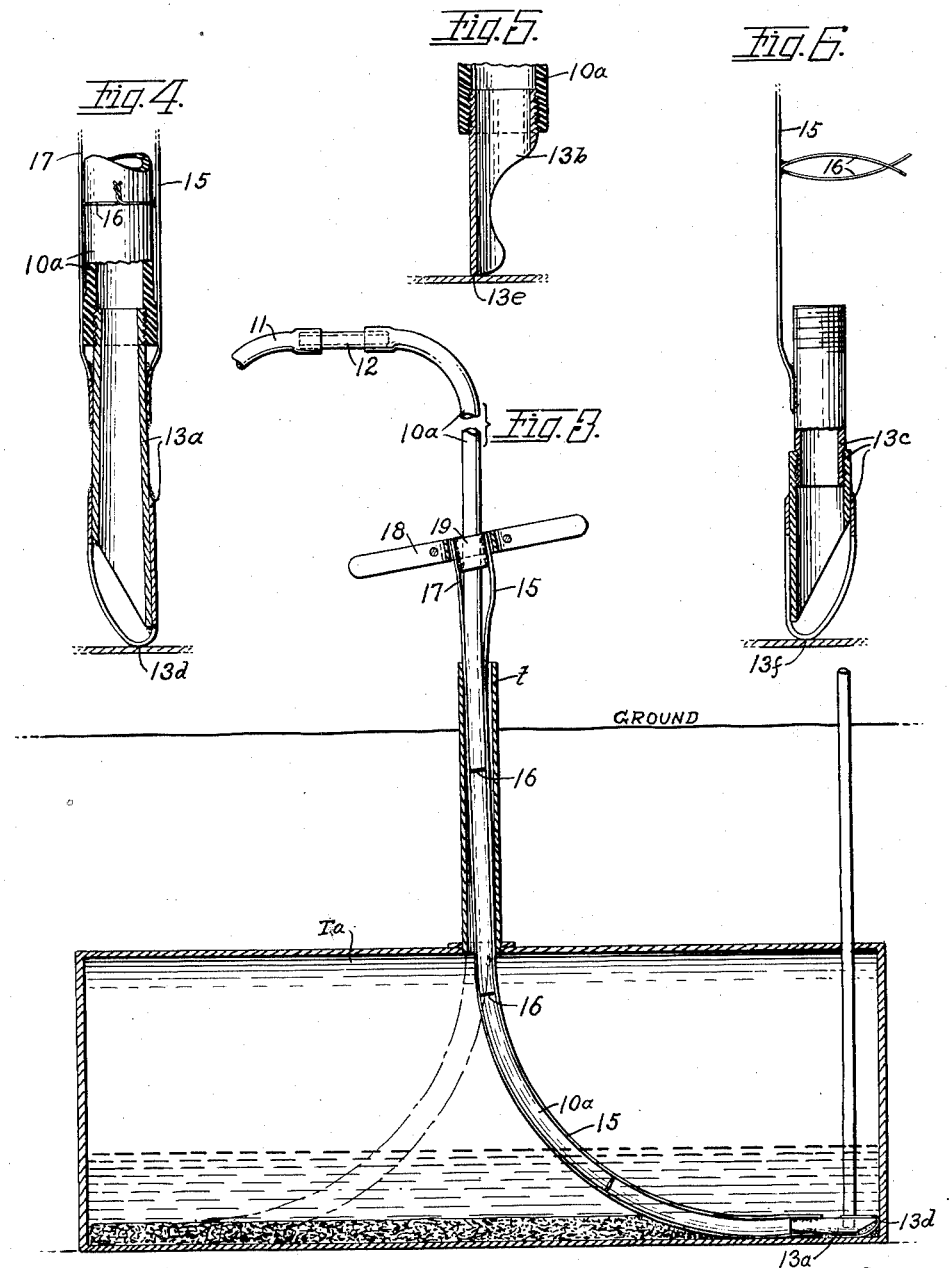

UNITED STATES PATENT OFFICE 2,612,998

APPARATUS FOR REMOVAL OF OIL TANK SLUDGE AND SEDIMENT

Talbot A. Smith, Baltimore, Md.

Application March 12, 1947, Serial No. 734,112

3 Claims. (Cl. 210—209)

This invention relates to flexible conduits with springy stiffening means; also to a flexible conduit with a removable and replaceable transparent section; also to a flexible conduit with inlet-end having a deflecting contact-point; and, more especially, it relates to a spring-stiffened flexible suctorial conduit-combination.

The primary object or purpose of this invention is to provide an inherently flexible conduit with spring-stiffening means to keep its intake or inlet-end pressed against the bottom of the tank containing oil or other liquid that deposits sludge or sediment, so the latter can be sucked out of the tank while leaving the upper parts of the pure or relatively pure oil in the tank for continual, uninterrupted draught and use for intended purposes.

Another object is to provide, in combination with said flexible conduit, a thin-wide springy strip secured on and along said flexible conduit and comprising means to resist flexing of said conduit laterally of said springy strip and to permit said conduit to be easily and considerably curved in a plane at right angles to the width of said springy strip; also to prevent the flexible conduit from becoming kinked or bent so abruptly as to be wholly or partly choked at any point where the spring-means is applied; also to provide a smooth, hard sliding surface at all points where sliding contact of this flexible conduit-section occurs when being manipulated in its operation of sucking sludge from a tank.

Another object is to provide this flexible conduit-section with a manipulating lever to cooperate with the spring-stiffening means for pressing the inlet-end down, sliding it to and fro, and moving it from side to side, so as to reach all points of the tank-floor where sludge may be settled on the floor.

Another object is to provide, in the flexible conduit-combination a transparent tubular section through which the operator can quickly see whenever sludge ceases to flow, and when the clean oil or liquid begins to flow, thereby to avoid undue waste to time, energy and liquid; also to have the ends of the transparent section removably seated in the ends of primary and secondary sections of flexible rubber or rubber-like conduit, so it is thereby guarded against breaking, and so it can be easily removed and replaced for internal cleaning and for substitution of another of its kind if occasion requires.

Another object is to provide the primary flexible conduit-section with an inlet-end guard of hard substantially non-flexible material that includes an excentric contact-point that cooperates with the spring-stiffening means and with pressure exerted by an operator towards the inlet-end and toward the tank-bottom on which the excentric point is pressed, so as to effect and direct the bending or curving of the part within the tank so the inlet-end can be moved and directed to all parts of the tank-floor.

Other objects and important features are pointed out or implied in the following details of description, in connection with the accompanying drawings in which:

Fig. 1 is a view of a simple form of the invention such as used in open-top tanks, or tanks that are accessible thru an opening that permits of access to all parts of its bottom by a rigid conduit-section.

Fig. 2 is an enlarged longitudinal sectional view showing the transparent conduit-section having its ends fitted in ends of the primary and secondary flexible conduit-sections, and the primary flexible conduit-sections being engaged with an end of a metal pipe or conduit-section.

Fig. 3 is a view of a modified form of the invention, for use where the tank is underground or in other position where necessary to have access to a pipe that extends up from the opening where filling and/or gauging, testing, etc., take place; so that, bending of the suction-conduit is necessary for reaching all points on the floor of the tank with the inlet-end of the suction-conduit; the curved broken lines showing the conduit bend in the opposite direction from the full-line position.

Figs. 4, 5, 6, 8 and 9, show different forms of inlet-end-portions with their respective excentric contact points.

Fig. 7 is an enlarged top-plan view of the manipulating lever, its ends broken off.

Referring to these drawings in detail, in which similar reference characters refer to similar parts throughout the several views, the invention is now described in detail as follows:

In Figs. 1 and 2, the primary flexible conduit-section is shown at 10, and the secondary flexible section is shown at 11, as also in Fig. 3. The transparent conduit-section is shown at 12, in Figs. 1, 2 and 3, its ends being secured in adjoining ends of the primary and secondary flexible conduit-sections and thereby protected against contact with floors, pavements etc., when these conduit sections are prone and being dragged or pushed along said floors or pavements. The rigid conduit-section of Figs. 1 and 2 is shown at 13, its inlet-end being notched for preventing it from being closed by contact with the tank-bottom 14.

In Figs. 3, 4, 5, 8 and 9, the primary flexible conduit-section is shown at 10a, and its inlet-end may be engaged with and braced by a rigid tubular section 13a, 13b or 13c (Figs. 3, 4, 5, 6), or may be engaged with and braced by end-extensions of the primary thin-wide spring-metal strip 15, as in Figs. 6, 8 and 9 where the contact points 15a and 15b are shown eccentric to the longitudinal center of the flexible section 10a. In Figs. 3, 4 and 6, means are shown at 16 for tying the spring-strip 15 to the primary flexible conduit-section 10a, as by tie-wires welded to the inner sides of the thin-wide spring-strip, passed around the conduit-section 10a, and tied or twisted (as seen in Fig. 4); but other means may be employed for securing the primary strip 15 and/or the secondary strip 17 to the primary conduit-section 10a, for instance, any appropriate cement or vulcanizing such as indicated at 20 in Figs. 8 and 9. In Figs. 3, 4, 5 and 6, the excentric contact points are seen at 13d, 13e and 13f. The wires or strips that include the contact points 13d and 13f have their end portions welded or otherwise secured on front and rear sides of the metal tubular inlet attachments of the primary-flexible conduit-section 10a. The front sides of the tubular metal parts are those nearest to the respective contact points, because, when downward pressure is applied on the contact points until the conduit 10a and spring-strip 15 become sufficiently bent, such front side moves in advance of the opposite or rear side. Moreover, when the lever 18 is moved to the inclined position shown in Fig. 3, it pulls the front strip 15 and pushes the rear strip 17, thereby bending these strips and the attached conduit-section so the front side or long side of the part 13 moves laterally in advance of the short or rear part.

The lever 18 is united with a tube-section or sleeve 19 by welding at 20 or other appropriate means; and the outer or upper ends of the strips 15 and 17 are likewise secured to the tube-section 19.

In operating this device, such as in Fig. 1, the conduit-section 11 is engaged with a suction-pump of any appropriate kind (not shown); then the inlet-end of the conduit-section 13 is lowered to the tank-bottom 14, and manually moved to all points of the tank-bottom until the operator sees, through the transparent section 12, that pure or sludge-free oil or liquid begins to flow, whereupon the operator ceases pumping, leaving only sludge-free liquid in the tank T.

The operation is less simple where the access to the tank Ta (Fig. 3) is underground and has only a tubular opening through which the sludge can be reached; so the use of the flexible conduit-section is essential; but if it is too flexible, and not provided with means to steer or guide its inlet-end, its utility is limited, its operation is hap-hazard, and its efficiency is very limited; therefore, the importance of this spring-strip 15 being relatively thin and wide and attached as described, should be readily seen and appreciated, especially when combined with the secondary spring-strip 17 and the controlling elements 18 and 19 and with the rigid inlet-connections shown in Figs. 3, 4, 5, 6, 8 and 9, with their respective eccentric contact points; for when the primary flexible conduit-section 10a is bent as shown in Fig. 3, its inlet-end can be moved either forward or rearward by raising or lowering the manipulative lever 18, and can be moved in either lateral direction by turning the lever about the center of the member 19, because its thinness provides ease of bending it forward and rearward, and its width provides rigidity against bending it laterally or transversely; so practically all sludge of the tank-bottom can be reached and sucked out the tank.

Prior to completing and using this invention, it has been customary to pump out all the oil from the tank, including sludge, when necessary or desirable to refill a sludge-infected tank; but this is unsatisfactory, because (1) the supply of oil from such tank is interrupted and such interruptions are often very expensive; (2) by the pumping means previously known and used, not all the sludge can be pumped out, because a lot of it is so viscous that it does not flow to the suction-opening if it is beyond a short distance from the suction-opening; and (3) heretofore, no means has been in use for directing a suction-opening or nozzle to all points on a tank-bottom under conditions shown in present Fig. 3.

The several modifications shown in these drawings are not all that can be made; for the invention is susceptible of numerous other modifications within the scope of the inventive ideas, as implied and claimed.

My invention is claimed as follows:

1. In a device for conducting sludge and sediment from oil-tanks, the combination comprising a suction-conduit that includes primary and secondary flexible conduit-sections; and a transparent conduit-section having its ends in and secured to ends of the flexible conduit-sections and in open communication therewith, a rigid conduit-section secured to the primary flexible conduit-section and in open communication therewith and being a means movable along and across a tank's bottom and to receive sludge therefrom, said primary flexible conduit section having an inlet-end cooperatively engaged with said rigid conduit section and being a means to extend into a tank and operable to be deflected so as to dispose said rigid conduit section at various points on the bottom of the tank while a long enough portion of said primary flexible conduit-section extends from the tank to be grasped by an operator for moving the inlet-end and the rigid conduit-section to various points on the bottom of the tank, a manipulative lever that includes a sleeve around and movable on said primary flexible conduit-section, and a thin-wide springy metal strip having one end secured to said primary flexible conduit-section at a point near said inlet-end and extending thence along the primary flexible conduit-section and secured to the latter at points between said inlet-end and lever and secured to said lever for manipulative cooperation in causing said primary flexible conduit to be flexed either forwardly or rearwardly.

2. In a device for conducting sludge and sediment from oil-tanks, the combination comprising a suction-conduit that includes primary and secondary flexible conduit-sections, and a transparent conduit-section having its ends in and secured to ends of the flexible conduit-sections and in open communication therewith, a rigid conduit-section secured to the primary flexible conduit-section and in open communication therewith and being a means movable along and across a tank's bottom and to receive sludge therefrom, said primary flexible conduit-section having an inlet-end and being a means to extend into a tank and operable to be deflected so as to dispose its inlet-end at various points on the bottom of the tank while a long-enough portion of said primary flexible conduit-section extends from the tank to be grasped by an operator for moving the inlet-end to various points on the bottom of the tank, two springy thin-wide metal strips on and extending along exterior sides of said primary flexible conduit section and each having one end secured adjacent to said inlet-end, and manipulative means operatively engaged with said metal strips and with said primary flexible conduit-section in a proper relation to effect a manually directed curvature in the inlet-end-portion of said primary flexible conduit-section while other portions of the primary flexible remain practically uncurved.

3. A flexible conduit section having an inlet-end in combination with a springy thin-wide metal strip extending along and united with the exterior of said conduit section, said springy thin-wide metal strip having an end-portion extending beyond and across said inlet-end and united with opposite sides of said inlet-end and curved in a proper relation to provide a substantially non-flexible contact-surface that is excentric to the center of said inlet-end.

TALBOT A. SMITH.

REFERENCES CITED

The following references are of record in the file of this patent:

UNITED STATES PATENTS

| Number | Name | Date |
| --- | --- | --- |
| 944,714 | Bimm | Dec. 28, 1909 |
| 1,060,665 | Bell | May 6, 1913 |
| 1,145,532 | Webb | July 6, 1915 |
| 1,318,881 | Kelley | Oct. 14, 1919 |
| 1,767,267 | Wappler | June 24, 1930 |
| 2,265,647 | King | Dec. 9, 1941 |
| 2,269,483 | Replogle | Jan. 13, 1942 |
| 2,332,940 | Senke | Oct. 26, 1943 |

OTHER REFERENCES

Chemical Handbook, by F. F. Griffin, 2nd edition, pub. 1877, page 295.

Braun-Knecht-Heimann Co., Catalog of Laboratory Supplies, Catalog No. 27, 1927, page 680.